(12) United States Patent
Cooper et al.

(10) Patent No.: US 8,436,943 B2
(45) Date of Patent: May 7, 2013

(54) SYSTEM AND METHOD FOR AUTOMATED AUDIO VISUAL SYSTEM CONTROL

(75) Inventors: Greg Cooper, Highland, UT (US); Craig Matsuura, Draper, UT (US); Thomas Leishman, Holladay, UT (US)

(73) Assignee: Control4 Corporation, Salt Lake City, UT (US)

( * ) Notice: Subject to any disclaimer, the term of this patent is extended or adjusted under 35 U.S.C. 154(b) by 1069 days.

(21) Appl. No.: 12/054,102

(22) Filed: Mar. 24, 2008

(65) Prior Publication Data

US 2008/0231544 A1 Sep. 25, 2008

Related U.S. Application Data

(60) Provisional application No. 60/896,469, filed on Mar. 22, 2007.

(51) Int. Cl.
| | |
|---|---|
| H04N 5/268 | (2006.01) |
| H04N 7/173 | (2006.01) |
| G09G 5/00 | (2006.01) |
| G05B 15/00 | (2006.01) |
| G06F 3/00 | (2006.01) |
| G06F 9/44 | (2006.01) |
| G06F 9/46 | (2006.01) |
| G06F 13/00 | (2006.01) |

(52) U.S. Cl.
USPC .............. 348/705; 345/1.1; 700/83; 719/317; 725/93

(58) Field of Classification Search ........................ None
See application file for complete search history.

(56) References Cited

U.S. PATENT DOCUMENTS

| | | |
|---|---|---|
| 3,878,377 A | 4/1975 | Brunone |
| 3,909,826 A | 9/1975 | Schildmeier et al. |
| 4,040,060 A | 8/1977 | Kaloi |
| 4,068,289 A | 1/1978 | Ferrigno |
| 4,138,684 A | 2/1979 | Kerr |
| 4,163,218 A | 7/1979 | Wu |
| 4,186,381 A | 1/1980 | Fleischer et al. |

(Continued)

FOREIGN PATENT DOCUMENTS

| | | |
|---|---|---|
| EP | 0 513 443 | 11/1992 |
| EP | 0 513 688 | 11/1992 |

OTHER PUBLICATIONS

Depositon of Bill Nuffer, CPP, Apr. 30, 2005, pp. 1-49.
Anova Control Center , Operators Manual, pp. 1-50.

*Primary Examiner* — Jefferey Harold
*Assistant Examiner* — Sean Haiem
(74) *Attorney, Agent, or Firm* — Austin Rapp & Hardman (57) ABSTRACT

A system and method are provided for automating control of a plurality of video displays coupled to a plurality of video sources through a switchable network. The method includes the operation of mapping a signal path for each signal between the plurality of video sources and the plurality of video displays to form a binding map. The binding map can be stored in a controllable device. In addition, a graphical user interface on a navigator can be generated. The graphical user interface is configured to represent the plurality of video displays. A further operation is connecting the plurality of video displays to the plurality of video sources through the switchable network based on the binding map and a user selection made with the graphical user interface in the controllable device.

17 Claims, 5 Drawing Sheets

U.S. PATENT DOCUMENTS

| | | | |
|---|---|---|---|
| 4,222,564 A | 9/1980 | Allen et al. | |
| 4,322,842 A | 3/1982 | Martinez | |
| 4,334,171 A | 6/1982 | Parman et al. | |
| 4,393,277 A | 7/1983 | Besen et al. | |
| 4,418,333 A | 11/1983 | Schwarzbach et al. | |
| 4,511,887 A | 4/1985 | Fiore | |
| 4,524,288 A | 6/1985 | Schimmelpennink et al. | |
| 4,527,247 A | 7/1985 | Kaiser et al. | |
| 4,636,791 A | 1/1987 | Burke et al. | |
| 4,644,320 A | 2/1987 | Carr et al. | |
| 4,703,306 A | 10/1987 | Barritt | |
| 4,706,274 A | 11/1987 | Baker et al. | |
| 4,755,792 A | 7/1988 | Pezzolo et al. | |
| 4,764,981 A | 8/1988 | Miyahara et al. | |
| 4,768,218 A | 8/1988 | Yorita | |
| 4,823,069 A | 4/1989 | Callahan et al. | |
| 4,825,209 A | 4/1989 | Sasaki et al. | |
| 4,829,554 A | 5/1989 | Barnes et al. | |
| 4,864,588 A | 9/1989 | Simpson et al. | |
| 4,873,711 A | 10/1989 | Roberts et al. | |
| 4,881,259 A | 11/1989 | Scordato | |
| 4,889,999 A | 12/1989 | Rowen | |
| 4,896,370 A | 1/1990 | Kasparian et al. | |
| 4,908,604 A | 3/1990 | Jacob | |
| 4,918,432 A | 4/1990 | Pauley et al. | |
| 4,918,717 A | 4/1990 | Bissonnette et al. | |
| 4,928,778 A | 5/1990 | Tin | |
| 4,939,792 A | 7/1990 | Urbish et al. | |
| 4,940,964 A | 7/1990 | Dao | |
| 4,977,529 A | 12/1990 | Gregg et al. | |
| 4,996,703 A | 2/1991 | Gray | |
| 5,017,837 A | 5/1991 | Hanna et al. | |
| 5,051,720 A | 9/1991 | Kittirutsunetorn | |
| 5,079,559 A | 1/1992 | Umetsu et al. | |
| 5,086,385 A * | 2/1992 | Launey et al. | 700/83 |
| 5,089,974 A | 2/1992 | Demeyer et al. | |
| 5,099,193 A | 3/1992 | Moseley et al. | |
| 5,109,222 A | 4/1992 | Welty | |
| 5,146,153 A | 9/1992 | Luchaco et al. | |
| 5,173,855 A | 12/1992 | Nielsen et al. | |
| 5,191,265 A | 3/1993 | D'Aleo et al. | |
| 5,218,344 A | 6/1993 | Ricketts | |
| 5,218,628 A | 6/1993 | Ito | |
| 5,224,648 A | 7/1993 | Simon et al. | |
| 5,237,264 A | 8/1993 | Moseley et al. | |
| 5,321,736 A | 6/1994 | Beasley | |
| 5,348,078 A | 9/1994 | Dushane et al. | |
| 5,359,625 A | 10/1994 | Vander Mey et al. | |
| 5,382,947 A | 1/1995 | Thaler et al. | |
| 5,386,209 A | 1/1995 | Thomas | |
| 5,400,041 A | 3/1995 | Strickland | |
| 5,400,246 A | 3/1995 | Wilson et al. | |
| 5,426,439 A | 6/1995 | Grossman | |
| 5,455,464 A | 10/1995 | Gosling | |
| 5,495,406 A | 2/1996 | Kushiro et al. | |
| 5,530,322 A | 6/1996 | Ferrence et al. | |
| 5,544,036 A | 8/1996 | Brown, Jr. et al. | |
| 5,565,855 A | 10/1996 | Knibbe | |
| 5,570,085 A | 10/1996 | Bertsch | |
| 5,572,438 A | 11/1996 | Ehlers et al. | |
| 5,574,748 A | 11/1996 | Vander Mey et al. | |
| 5,598,039 A | 1/1997 | Weber | |
| 5,736,965 A | 4/1998 | Mosebrook et al. | |
| 5,793,300 A | 8/1998 | Suman et al. | |
| 5,798,581 A | 8/1998 | Keagy et al. | |
| 5,905,442 A | 5/1999 | Mosebrook et al. | |
| 5,982,103 A | 11/1999 | Mosebrook et al. | |
| 6,687,487 B1 | 2/2004 | Mosebrook et al. | |
| 6,774,912 B1 * | 8/2004 | Ahmed et al. | 345/629 |
| 6,803,728 B2 | 10/2004 | Balasubramaniam | |
| 2002/0116539 A1 * | 8/2002 | Bryczkowski et al. | 709/317 |
| 2005/0117910 A1 * | 6/2005 | Foote et al. | 398/106 |
| 2007/0050828 A1 * | 3/2007 | Renzi et al. | 725/93 |
| 2007/0053513 A1 * | 3/2007 | Hoffberg | 380/201 |
| 2008/0118178 A1 * | 5/2008 | Way et al. | 382/275 |

* cited by examiner

SYSTEM AND METHOD FOR AUTOMATED AUDIO VISUAL SYSTEM CONTROL

CROSS-REFERENCE TO RELATED APPLICATIONS AND CLAIM OF PRIORITY

Priority of U.S. Provisional patent application Ser. No. 60/896,469 filed on Mar. 22, 2007 is claimed.

FIELD OF THE INVENTION

The present invention relates generally to the control of automated equipment.

BACKGROUND

The nexus of high definition television (HDTV), high speed electronics, and exponentially increasing digital storage capacity has produced a revolution in the audiovisual industry that has been unparalleled since the creation of the television. Each year, new genres of video displays are released, such as high definition liquid crystal displays, plasma displays, micro-mirror projection displays, liquid crystal projection displays, liquid crystal on silicon displays, and grating light valve based displays.

Not to be left behind, the only constant in the audio industry has been change, with new formats including super-audio CD, audio DVD, the highly popular MP3, WAV, and other audio formats. The new formats have enabled a new generation of small, portable audio players that allow people to keep their entire audio library on a single source, or transfer it between sources such as their computer, their car radio, their portable MP3 player, and their home stereo.

Video storage is quickly following the lead of the audio industry, with the advent of various high definition video storage means, such as high definition DVD, BlueRay®, and integrated digital video recorders capable of recording multiple broadcasts, pausing live TV, and storing video libraries in single locations. A variety of audio and video broadcasting sources are also available, with a recent resurgence in broadcasting video over the public airwaves with advent of HDTV, hundreds of new digital video cable channels to choose from, and literally thousands of channels available in both video and audio from various satellite sources.

The legion of recent changes in the audio and video industries has dramatically increased the complexity of connecting and enjoying audiovisual entertainment. A quarter century ago a typical family room consisted of a television and a separate, typically unconnected stereo receiver. Now a home entertainment system can include 6, 7, even 10 different interconnected electronic devices, such as a television, stereo receiver, CD player, DVD player, digital video recorder, satellite receiver or cable box, and MP3 player. To connect these devices to properly function together requires fairly advanced skills. Each device typically comes with its own unique remote control. Controlling the multiplicity of devices can prove cumbersome. To reduce the complexity, advanced, programmable remote controls can be used to condense the number of controls needed to control such a system.

When a more advanced system is needed, the complexity required to connect and operate the advanced system can be beyond a typical user's knowledge or desire. For example, some users desire to view multiple video displays at one time (i.e., a video wall) where two or more televisions are interconnected to the other electronic devices. Having two, three, four, or more interconnected video displays enables a user to view multiple sports feeds, news feeds, or other types of video displays. In fact, connecting and switching the multiple video displays between the various video sources and electronic devices can be so unwieldy that it discourages the user from setting up or using such a system. Properly setting up such a system may take a few days or up to a week of an expensive programmer's time to setup automation software and complex macros to control a complicated audio video system as described. Even advanced controllers that are configured to operate audiovisual entertainment cannot easily and quickly provide a user controls for quickly and conveniently switching the multiple video displays between multiple video sources and a variety of electronic equipment.

SUMMARY

A system and method are provided for automating control of a plurality of video displays coupled to a plurality of video sources through a switchable network. The method includes the operation of mapping a signal path for each signal between the plurality of video sources and the plurality of video displays to form a binding map. The binding map can be stored in a controllable device. In addition, a graphical user interface on a navigator can be generated. The graphical user interface is configured to represent the plurality of video displays. A further operation is connecting the plurality of video displays to the plurality of video sources through the switchable network based on the binding map and a user selection made with the graphical user interface in the controllable device.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Figure 1:
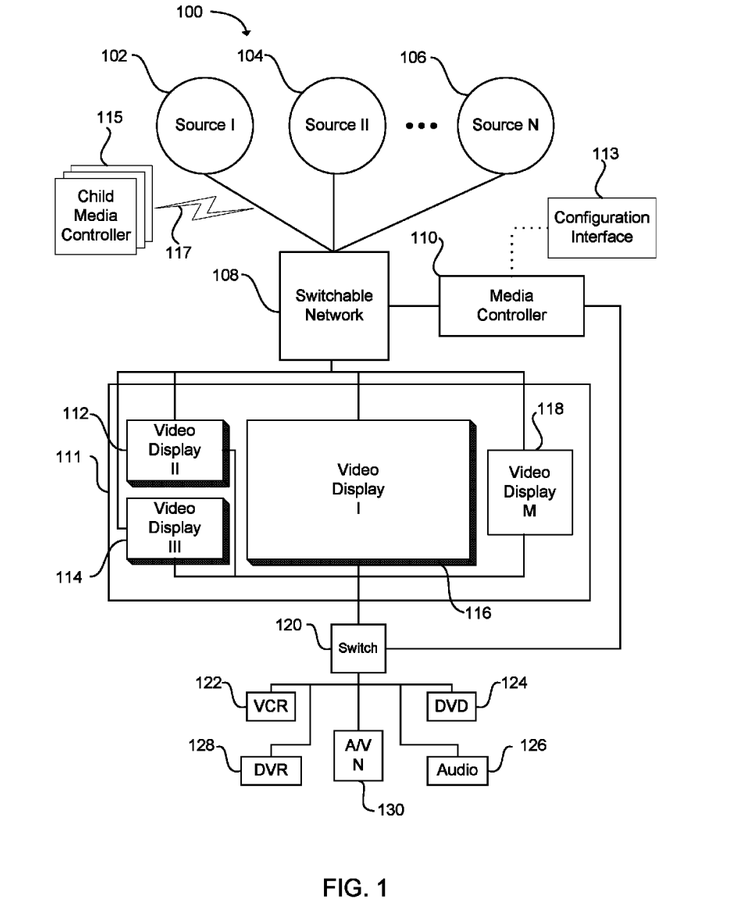
FIG. 1 is a diagram displaying a plurality of interconnected video sources, video displays, switching devices, and audiovisual equipment which are interconnected with a media controller to store a binding map in accordance with an embodiment of the present invention.

As illustrated in FIG. 1, a system 100 is provided for automated generation of audio visual system controls, in an example embodiment. The system can include a plurality of N video sources 102-106. The video sources can be satellite based, cable transmission based, terrestrial transmission based, internet based, a combination of the aforementioned, or any other broadband delivery method. The plurality of sources can include receiver boxes configured to decode each received signal. One or more of the plurality of sources can include a digital video recorder (DVR) to enable the video signal from the source to be stored for a predetermined amount of time to enable pausing of live TV, instant playback, commercial skip, and the like. The DVR can be a physical device located in close proximity to the receiver box(es). Alternatively, the DVR can be a service offered by the video source provider.

The N video sources can each be interconnected through a switchable network 108 to a video wall 111 that includes a plurality of M video displays 112-118. The video displays can include any type of video presentation equipment, including front and back projection type displays, LCD and plasma type displays, CRT displays, and any other type of display capable of generating a moving video picture. The switchable network can be any type of audio/video switch configured to enable two or more of the N sources to be interconnected with two or more of the M video displays, respectively. One or more secondary switching devices 120 can be coupled between the M video displays and a plurality of electronic devices, such as a VCR 122, a DVD player 124 (standard or high definition), an audio source 126 such as a stereo, digital music player, or satellite audio receiver, a DVR 128, or any other desired number of different audio/video equipment 130 that has been or will be developed. The connection of the electronic equipment through the secondary switch to the M video displays enables any of the selected electronic equipment to be electronically connected to any of the M video displays.

Even assuming that a single programmable remote control could be used to control all of the devices shown in FIG. 1, the task of manually altering the setup of the video wall 111 can significantly reduce the utility of such a setup. For example, a user watching a plurality of sporting events on the M video displays may want to reconfigure the video wall to enable the user to move a video source from a small display, such as video display III 114 to a larger display such as video display I 116. The user may then want to replay the last several seconds to review the video that was previously viewed on the smaller screen. In order to accomplish this seemingly simple task, the user will need to perform at least the following tasks: 1) tune a video source, such as source II 104 to the desired channel; 2) configure the switchable network 118 to connect source II to video display I; 3) configure video display I to display the video received from source II through the switchable network; 4) configure the secondary switch 120 to connect the DVR 128 to video display I; 5) command the DVR to replay a predetermined amount of video that was previously recorded (assuming that the DVR had been previously connected to the same video source as video display III).

An intimate knowledge of each of the aforementioned devices is likely needed in order to effectively control the devices in the system 100. Many potential users of a video wall would not generally have the time or interest to gain a sufficient understanding to control the video wall, nor would they want to perform the five tasks listed above every time they wanted to replay a few seconds of video feed.

One solution to effectively controlling a video wall is to add more detailed and complex programming to a programmable remote control. Rather than just using the programmable remote to manually control the various interconnected devices, the remote may be custom programmed to perform a macro, such as the series of five steps above. This would enable the user to quickly swap video sources between video display III 114 and video display I 116, including all of the necessary switching between the video source 104 and the DVR 128.

Because of the wide variety of devices and products, programming even a simple video wall can quickly become unwieldy and expensive. In addition, each automated device includes a variety of internal features that each of the video sources 102-106, switches 108, 120, video displays 112-118, and electronic devices 120-130 can access, which also increases the overall system complexity. Since no single electronics manufacturer can know the contents of an entire video wall, each video wall 111 and associated devices would typically need unique, customized programming based on the individual setup and the types of equipment purchased. A substantially complete software package, capable of performing most functions of the equipment in the system 100 would likely entail hundreds or thousands of lines of code that would enable a user to quickly perform desired tasks such as automated swapping between the various video sources, video displays and connecting the electronic devices to the desired display. Thus, such a solution is generally available to users with considerable monetary resources available to construct a video wall and pay a professional to program the software code to automate the video wall.

What is needed is a means for automating control of a video wall that does not require extensive customized programming. The present invention provides a relatively simple user interface for automating control of the video displays and associated electronic devices in a video wall without the need for substantial amounts of customized programming. In one embodiment, the media controller 110 can be connected with the switchable network 108, the N sources 102-106, the M video displays 112-118, other potential switching needs, such as the secondary switch 120, and various electronic devices 122-130. The media controller or controllable device can be configured to automate the connection and control of the N video sources, M video displays, switches, and various electronic devices, all collectively referred to as the video wall electronic devices.

For example, in one embodiment the media controller 110 can be used to control the video wall electronic devices. The media controller can communicate with each device in the video wall electronic device group that is desired to be controlled. Communication with each device can be accomplished through wired or wireless means. The communication means can include any communication between the media controller and the electronic devices using RF wireless communication such as a standardized communication format under IEEE 802 or any other standardized or proprietary wireless communication scheme. Communication means can further include optical communication such as infrared or fiber optic communication, or wired communication through a wired connection such as a serial RS 232, USB, Firewire, or some other type of connection configured to transmit information between the media controller and the media wall electronic devices.

The media controller 110 can be configured by interfacing the media controller with a configuration interface 113, such as a proprietary graphical user interface or general purpose computer. The configuration interface may be temporarily connected to the media controller. The configuration interface can configure the media controller through a simple, graphical interface, as described in U.S. patent application Ser. No. 11/221,143 filed on Sep. 6, 2005, which is herein incorporated by reference. Rather than having to write specialized lines of code to control each of the video wall electronic devices, a user can simply select which types of devices are connected to the media controller, and how the electronic devices are interconnected.

For example, the user can use a graphical interface to inform the media controller 110 that a Knox 16×16 audio/video routing switcher is connected to the media controller I/O port 1 using an RS 232 serial connection. The user can then select the various electronic devices from drop down boxes, or other such graphical user interfaces, and program the type of device and desired connections between the devices. In another example, the user may select video display I 116 as a Sony® 60" Grand WEGA™ SXRD™ Rear Projection HDTV. The Sony can be connected to media controller I/O port number 2 using an infrared extender cable that is configured to enable the media controller to communicate with the infrared I/O port in the Sony television. Source I 102 may be defined in the media controller as a Dish™ HD digital video recorder receiver that is connected to the necessary satellite receiver(s). The user can identify that the Dish™ receiver is connected to the media controller I/O port number 3 using an IEEE 1394 Firewire connection.

The media controller 110 can also be informed, using the configuration interface 113, which types of connections are made between the various devices in the video wall electronic devices. Once the types of devices are selected, such as the Sony® television and Dish™ Network receiver, a graphical interface on the configuration interface can enable a user to select the connections between the devices. For example, a connection between the Dish™ video receiver and the Sony® television can be selected as an HDMI connection. The media controller can map the types of connections between the various devices in the system 100 to map which types of signals can be sent through the various connections. For example, video display I 116 may be a high definition display. Source II 104 may be capable of providing a high definition signal. If a user chose to move the video feed that is being shown on video display III 114 (which may be a standard definition video feed) to video display I, the media controller can use source II to provide the video feed in high definition. Only connections capable of carrying a high definition signal, such as HDMI connectors, will be assigned by the media controller to transmit the high definition signal from source II to video display I.

The media controller can be expanded through the use of one or more child media controllers 115. The child media controllers can be configured to electrically communicate with the media controller, which can act as a host or hub controller. The child media controller can electrically communicate through wireless 117, wired, or optical means, with a host media controller. The child media controller can be used to expand the number of devices controllable by the media controller. The child media controller can also be located in a separate location, such as a different room, to enable a single media controller hub to be used to operate audio/video equipment, electrical devices, video displays, and video sources throughout a home, office, or building.

Once all of the video wall electronic devices have been defined within the media controller 110 using the configuration interface 113, and the connections between the devices identified, the media controller can then be used to automate the control of the video wall 111. The media controller may load the software drivers used to control the video wall electronic devices. Using any needed drivers, a map of the connections, and connection formats between the devices, the media controller can then control the video wall 111 and the system 100 without the need for extensive, individualized programming.

Figure 2:
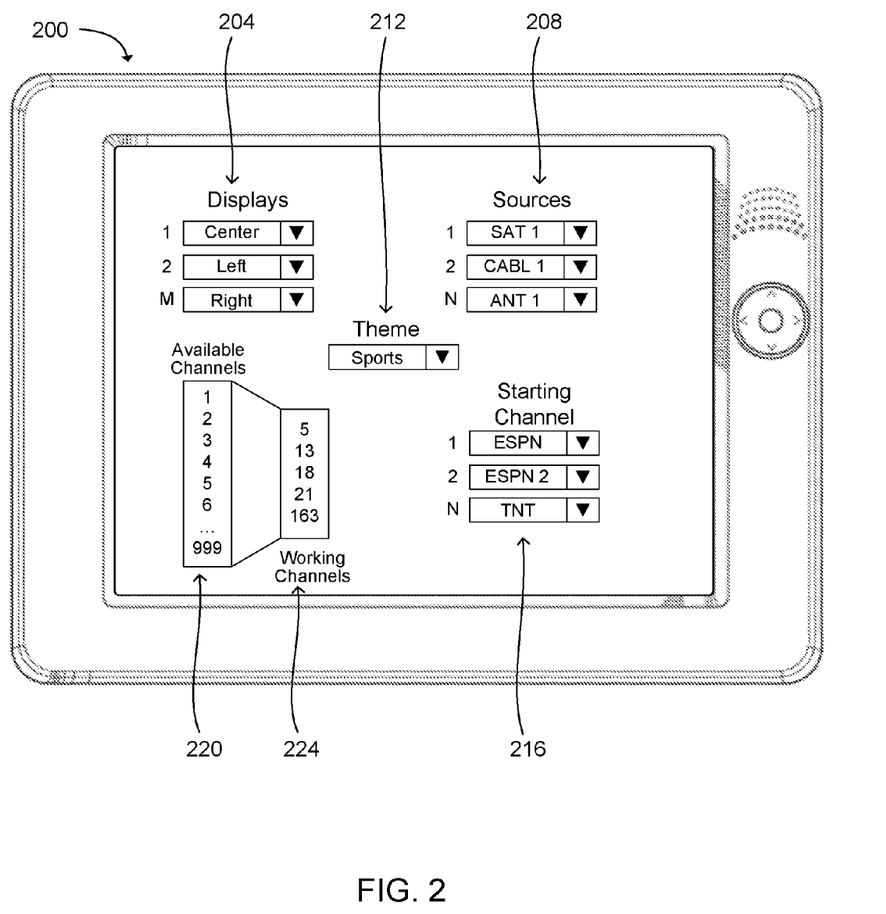
FIG. 2 is a front view of a navigator configured to generate a graphical user interface to control audio visual equipment in accordance with an embodiment of the present invention.

In one embodiment, a software plug-in can be installed in the configuration interface 113. The plug-in can enable a user to build a graphical user interface on a navigator to automate control of the video wall system 100. The navigator can be a communications device configured to enable automated control of the video wall system 100. In one embodiment, the navigator 200 can be a touch pad graphical user interface, as shown in FIG. 2, although any type of programmable remote control can be used. The navigator can communicate with the media controller 110 using any wired or wireless communication means capable of sending information between the navigator and the media controller, such as radio frequency communication, optical communication, and/or wired communications means, as previously discussed.

The navigator 200 and/or configuration interface 113 (FIG. 1) can enable a user to configure a video wall graphical interface for the navigator to enable a user to utilize the navigator to automate control of the video wall system 100 (FIG. 1). For example, FIG. 2 shows a setup screen in which a user can select from a plurality of video sources, displays, and electronic devices that had been entered into the media controller, as previously disclosed. The user can select the video displays that will be controlled using the navigator, including the location of the displays on the video wall. The user can also select the video sources 208, a pre-selected theme 212, such as sports, entertainment, news, and the like. A starting channel 216 for each theme can be selected for each of the displays in the video wall 111 that will be controlled using the navigator.

Available channels 220 from the selected sources 208 are listed on the setup screen. A user can then select, for each theme, a working set 224 of channels. The working set of channels can reduce the number of channels from potentially hundreds of available channels to a working group of desired channels for each theme to enable a user to navigate the video wall more easily.

Figure 3:
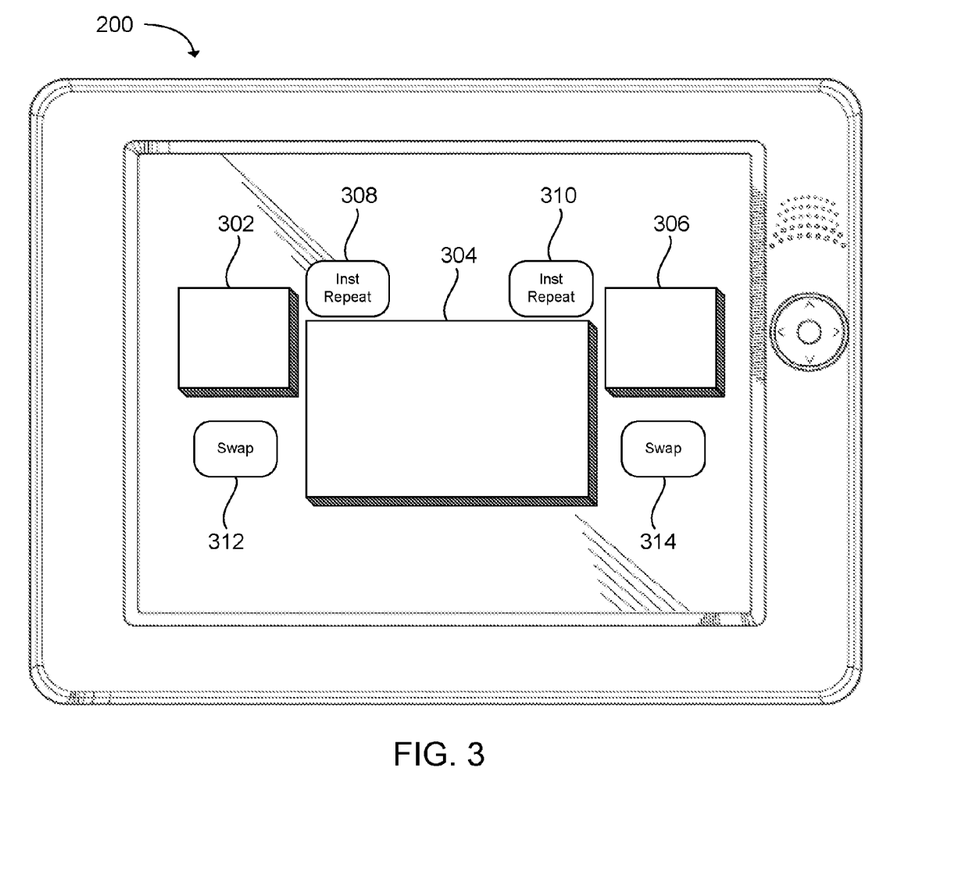
FIG. 3 is the navigator of FIG. 2, showing a graphical user interface generated to control the audio visual system in accordance with an embodiment of the present invention.

FIG. 3 shows an example embodiment of a graphical user interface created on the navigator 200 using the setup screen shown in FIG. 2 and described above. Per the setup in FIG. 2, the left screen 302 is selected to be connected to a cable video source. The center screen 304 is selected to be connected to a satellite video source, and the right screen is selected to be connected to a terrestrial earth transmission source through an antenna. Of course, any type of source can be connected to any type of display, depending on the types of displays and sources available. Other types of sources may include electronic devices such as a VCR, DVD, CD, DVR, or other digital information storage or delivery systems. In one embodiment, each source can be electrically coupled to a digital video recorder.

The theme in FIG. 2 was selected to be sports, with the starting channel for the center, left, and right displays selected for ESPN, ESPN2, and TNT respectively. In the embodiment of FIG. 3, the graphical interface on the navigator 200 can be configured to enable a user to swap the video currently being shown on two of the displays by pressing one of the swap buttons 312, 314. For example, a user could swap the ESPN2 channel being shown on display 302 to display 304, while the ESPN channel shown on display 304 can be swapped to display 302. As previously discussed, swapping the channels on the two displays may involve a complex set of instructions sent to a plurality of electronic devices, such as video sources, switch matrixes, digital video recorders, and the video displays.

Rather than sending each of the devices manually, a user may merely press the swap button 312. The navigator can send a single command to the media controller. The plug-in for the media controller can then interpret the command received from the navigator and proceed to send the correct commands to the necessary equipment to swap the channels.

Alternatively, the plug-in software may be stored in the navigator itself. In this case, the navigator can send a plurality of commands to the media controller, instructing it which devices within the video wall system 100 (FIG. 1) need to be adjusted to swap channels between the two displays. However, storing the plug-in in the media controller 110 can be preferable, since limiting the number of commands sent by the navigator can increase the likelihood that the commands are correctly received by the media controller.

Similarly, instant repeat buttons 308, 310 can be configured to control selected video displays. In one embodiment, the instant repeat buttons can repeat a video sequence shown in a selected display for a predetermined amount of time. The video sequence can be from a prerecorded video source or a live video source connected to a digital video recorder. The amount of time to be replayed can be configured at a previous time in the media controller 110 (FIG. 1). Alternatively, the amount of replay time may be variably controlled using the navigator.

In another embodiment, the instant repeat button can perform more than one function, such as swapping between a smaller and larger source, such as video displays 304 and 306, and repeating a predetermined length of video feed from the smaller video display 306 on the larger video display 304. This feature can enable a user to watch, for example, a plurality of different sporting venues on the video wall. If the user desires to review an action sports sequence displayed on one of the smaller displays, the user merely needs to press one of the instant replay buttons to swap the video feeds and rewind the video sequence that had been showing on the small video screen to re-display the sequence on the large video screen.

Figure 4:
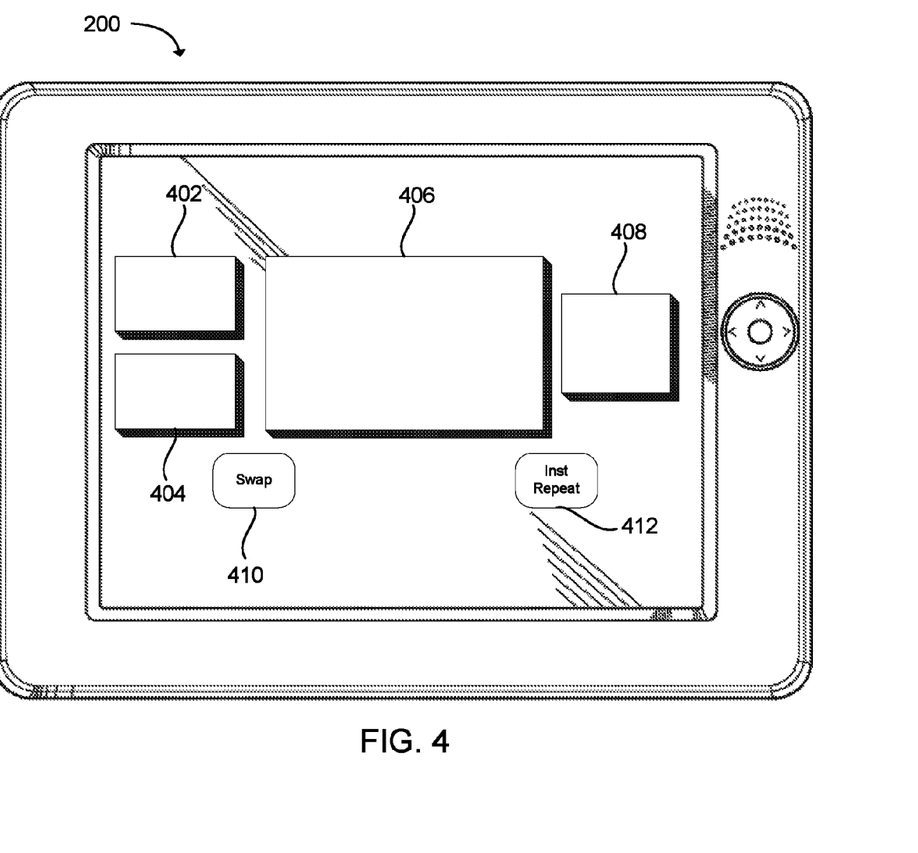
FIG. 4 is the navigator of FIG. 2, displaying an alternative user interface generated to control the audio visual system in accordance with an embodiment of the present invention.

An alternative graphical interface is shown in FIG. 4 on the media controller 200. A plurality of video displays 402-408 is shown. In this embodiment, a user can swap between two video displays by selecting the swap button 410, followed by selecting two sources to swap. Any of the video feeds to the plurality of video displays can be replayed for a predetermined amount of time by selecting the instant repeat button 412 followed by the desired video display to replay. Various other controls can be displayed between the swap and instant repeat buttons when a display is selected.

The graphical interface on the navigator can be constructed in a user friendly approach to enable a user to control the various displays within the video wall 111 (FIG. 1). For example, in one embodiment, a user can change a channel by selecting one of the displays, such as video display 306. When the display has been selected then additional buttons, drop down boxes, or other types of controls can be displayed, enabling the user to control the selected display. The additional controls can allow the user to change a channel to one of the working channels 224 within the selected theme 212 (FIG. 2).

The number of controls and type of controls displayed in the graphical interface on the navigator 200 can be dependent upon the video display selected. For example, if the video source of video display 406 is a DVD player, rather than a live feed, then extra controls for the DVD player may appear when video display 406 is selected.

While a variety of examples have been given for potential graphical interfaces on the navigator 200 to enable the user to control a video wall, the examples are not meant to be limiting in scope. The interface may be any user friendly interface that enables the user to send commands from the navigator to the media controller that allows automated control of a video wall, such as the video wall 111 shown in FIG. 1, or on the graphical interfaces in FIGS. 3 and 4.

Figure 5:
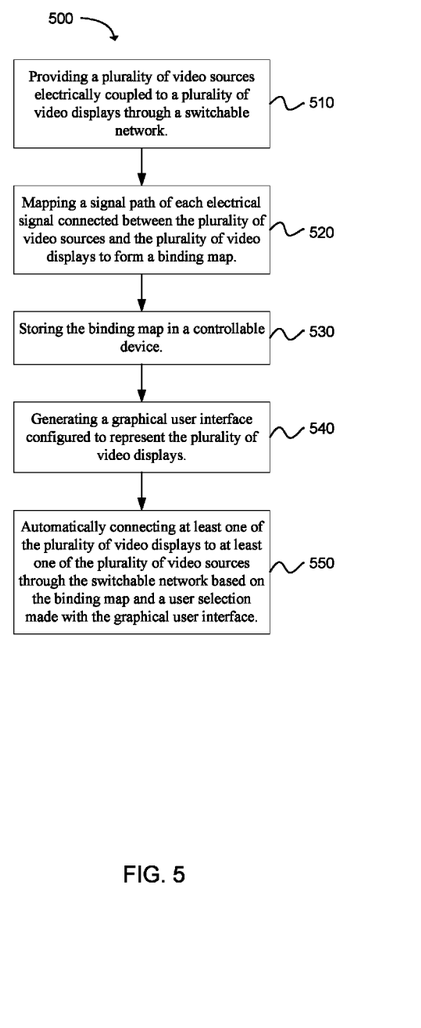
FIG. 5 is a flow chart depicting a method for automating control of audio visual system using a switchable network in accordance with an embodiment of the present invention.

A further embodiment of the invention includes a method 500 for automating control of a plurality of video displays coupled to a plurality of video sources through a switchable network, as depicted in the flow chart of FIG. 5. The method can include the operation of mapping a signal path for each electrical signal connected between the plurality of video sources and the plurality of video displays to form a binding map, as shown in block 510. A further operation includes storing the binding map in a controllable device, as shown in block 520. The controllable device can be the media controller as previously discussed.

Another operation provides generating a graphical user interface on a navigator, wherein the graphical user interface is configured to represent the plurality of video displays, as shown in block 530. The graphical user interface, as disclosed above, can be any type of interface capable of enabling a user to control the video displays and video sources. The graphical user interface can also be used to control the switchable network and a plurality of audiovisual equipment in conjunction with the media controller. The audiovisual equipment can be controlled can be connected to the plurality of video displays and/or the plurality of video sources through the switchable network. One or more secondary switches can also be used to connect the various equipment, sources, and displays.

In one embodiment of the invention, the graphical user interface is generated by the media controller or controllable device based on the binding map. This provides a useful interface for the end user without any actual programming. The interface generation system may have a number of templates that can be used for various expected configurations or the interface may be generated based on certain pre-defined rules which can examine the desired audio visual configurations. Alternatively, the end user can provide input regarding how the user would like the user interface to be graphically or logically arranged.

A further operation includes generating a graphical user interface on a navigator, wherein the graphical user interface is configured to represent the plurality of video displays, as shown in block 540. The graphical user interface can be configured based on the binding map stored in the controllable device. A user can automate control of the displays, sources, switches, and audiovisual equipment using the graphical user interface on the navigator. The navigator can send commands to the controllable device based on user interaction with the graphical interface. The controllable device can then control the various displays, sources, switches, and audiovisual equipment based on the binding map and wired, wireless, and/or optical connections between the controllable device and the displays, sources, switches, and audiovisual equipment.

The binding map can also include information related to the types of connections between the displays, sources, switches, and audiovisual equipment. For example, connections between the devices may be wireless connections having a predetermined bandwidth, coaxial connections, wired connections, optical connections, and connections of a specified format such as USB, IEEE 1394, 802.11, Zigbee, HDMI, DVI, component connections, and the like. Storing this information in the binding map enables more intelligent choices to be made, based on the type of signal that is to be routed between the various devices, such as an audio signal, a control signal, a standard definition video signal, a high definition video signal, and so forth.

The media controller 110 and navigator 200 enable a symbiotic relationship that allows a user that is not highly skilled in connecting and controlling video equipment to electrically couple a video wall to a media controller and construct a graphical interface for the navigator that permits the user to quickly and simply make desired changes in a video wall, such as changing channels on the various displays, electrically connecting desired sources and electronic audio/video equipment to the desired displays, and swapping replaying video feeds on the various displays. Such a system can be rapidly configured without the need for extensive, customized programming.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for automating control of a plurality of video displays coupled to a plurality of video sources through a switchable network, comprising:
   mapping a signal path for each signal between the plurality of video sources and the plurality of video displays to form a binding map;
   storing the binding map in a controllable device, the binding map including connection information describing connections made between the plurality of video displays, the plurality of video sources, and the switchable network, the connection information including connection formats selected from a group comprising: wireless connections; coaxial connetions; wired connections; and optical connections;
   generating a graphical user interface on a navigator device, wherein the graphical user interface is configured to represent the plurality of video displays; and
   connecting at least one of the plurality of video displays to at least one of the plurality of video sources through the switchable network based on the binding map and a user selection made with the graphical user interface in the controllable device;
   wherein an individual of the at least one of the plurality of video sources is associated with an individual of the at least one of the plurality of video displays and is switchable to another individual of the at least one of the plurality of video displays.

2. A method as in claim 1, further comprising connecting a plurality of audio visual equipment to the plurality of video displays through at least one of the switchable network and at least one secondary switch device.

3. A method as in claim 2, wherein the at least one secondary switch device is connected to the switchable network and the controllable device.

4. A method as in claim 1, further comprising connecting at least one of the plurality of video sources and the plurality of video displays to the controllable device.

5. A method as in claim 1, further comprising entering connection format information into the controllable device comprising the connection formats used between the plurality of video displays, the plurality of video sources, and the switchable network, the connection formats comprising at least one selected from the group consisting of: wireless connections; coaxial connetions; wired connections; optical connections; and connections of a specified format including at least one of USB, IEEE 1394, 802.11, Zigbee, HDMI, DVI, and component connections.

6. A method as in claim 1, further comprising enabling the controllable device to generate the graphical user interface for the navigator using the binding map stored in the controllable device.

7. A method as in claim 1, further comprising enabling a user to generate a view for the graphical user interface for the navigator using the binding map stored in the controllable device.

8. A method as in claim 1, further comprising controlling additional audiovisual equipment through the use of a child media controller device in communication with the additional audiovisual equipment through the controllable device.

9. An automated video wall control system, comprising:
   a plurality of video displays coupled to a switch network;
   a plurality of video sources coupled to the plurality of video displays through the switch network;
   a media controller electrically coupled to at least two of the plurality of video displays and at least two of the plurality of video sources, wherein the media controller is configured to control the plurality of video displays and the plurality of video sources to which it is connected using control drivers stored within the media controller, wherein an individual of the at least two of the plurality of video sources is associated with an individual of the at least two of the plurality of video displays and is switchable to another individual of the at least two of the plurality of video displays, wherein the media controller is figured to store a binding map to represent connection information describing connections made between the plurality of video displays, the plurality of video sources, and the switchable network, the connection information including connection formats selected from a group comprising: wireless connections; coaxial connetions; wired connections; optical connections; and
   a navigator configured to display a graphical user interface based on connections of the media controller, wherein the navigator is enabled to send commands to the media controller based on a user's interaction with the graphical user interface to automate control of the video wall system.

10. The system of claim 9, further comprising at least one electronic audio video device electrically coupled through at least one of the switch network and a secondary switch to at least one of the plurality of video displays and the plurality of video sources.

11. The system of claim 10, wherein the media controller is electrically coupled to the at least one electronic audio video device.

12. The system of claim 9, wherein the graphical user interface for the navigator is configured based on the binding map.

13. The system of claim 9, further comprising a child media controller device in electronic communication with media controller, wherein the child media controller is configured to control at least one of the plurality of video displays, the plurality of video sources, and at least one electronic audio/video device.

14. A means for automating control of a plurality of video displays coupled to a plurality of video sources through a switchable network, comprising:
   a means for mapping a signal path of each electrical signal connected between the plurality of video sources and the plurality of video displays to form a binding map;

a means for storing the binding map in a controllable device, the binding map including connection information describing connections made between the plurality of video displays, the plurality of video sources, and the switchable network, the connection information including connection formats selected from a group comprising: wireless connections; coaxial connetions; wired connections; optical connections;

a means for generating a graphical user interface configured to represent the plurality of video displays; and a means for automatically connecting at least one of the plurality of video displays to at least one of the plurality of video sources through the switchable network based on the binding map and a user selection made with the graphical user interface, wherein an individual of the at least one of the plurality of video sources is associated with an individual of the at least one of the plurality of video displays and is switchable to another individual of the at least one of the plurality of video displays.

15. A method as in claim 1, wherein the at least one of the plurality of video sources comprises at least a first video source and a second video source, and the at least one of the plurality of video displays comprises at least a first video display and a second video display, the first video source being displayed on the first video display and the second video source being displayed on the second video display, the method further comprising swapping the first and second video sources substantially simultaneously in response to swap input from a user such that the first video source is displayed on the second video display and the second video source is displayed on the first video display.

16. A method as in claim 1, further comprising replaying a portion of content of an individual of the plurality of video sources on a separate display from an individual of the plurality of video displays playing the content of the individual of the plurality of video sources while the content continues playing in response to replay input from a user.

17. A method as in claim 16, further comprising swapping displays associated with the replayed content portion and the video source substantially simultaneously in response to the replay input from a user.

* * * * *

UNITED STATES PATENT AND TRADEMARK OFFICE
CERTIFICATE OF CORRECTION

PATENT NO. : 8,436,943 B2  
APPLICATION NO. : 12/054102  
DATED : May 7, 2013  
INVENTOR(S) : Greg Cooper et al.

Page 1 of 1

It is certified that error appears in the above-identified patent and that said Letters Patent is hereby corrected as shown below:

In the Claims

Column 9, line 36, Claim 1, delete "coaxial connetions" and replace it with --coaxial connections--.

Column 10, lines 37–38, Claim 9, delete "coaxial connetions" and replace it with --coaxial connections--.

Column 11, line 7, Claim 14, delete "coaxial connetions" and replace it with --coaxial connections--.

Signed and Sealed this  
Tenth Day of December, 2013

Margaret A. Focarino  
*Commissioner for Patents of the United States Patent and Trademark Office*